(12) United States Patent
Kim et al.

(10) Patent No.: US 6,232,252 B1
(45) Date of Patent: May 15, 2001

(54) METHOD FOR PREPARING SILICON NITRIDE CERAMIC WITH HIGH STRENGTH AND TOUGHNESS

(75) Inventors: Hai Doo Kim, Changwon-shi; Byung Dong Han, Daegu-shi; Dong Soo Park, Changwon-shi, all of (KR)

(73) Assignee: Korea Institute of Machinery and Materials (KR)

( * ) Notice: Subject to any disclaimer, the term of this patent is extended or adjusted under 35 U.S.C. 154(b) by 0 days.

(21) Appl. No.: 09/415,112

(22) Filed: Oct. 8, 1999

(30) Foreign Application Priority Data

Aug. 17, 1999 (KR) .................................................. 99-33967

(51) Int. Cl.$^7$ .................................................. C04B 35/587
(52) U.S. Cl. ........................ 501/97.2; 501/97.1; 501/96.5; 264/665; 264/683
(58) Field of Search .................................. 501/97.1, 97.2, 501/96.5; 264/665, 659, 683

(56) References Cited

U.S. PATENT DOCUMENTS

| | | | |
|---|---|---|---|
| 3,833,389 | * 9/1974 | Komeya et al. | 501/97.2 |
| 4,619,905 | * 10/1986 | Natansohn et al. | 501/97.2 |
| 4,886,556 | * 12/1989 | Suzuki et al. | 264/63 |
| 5,785,922 | * 7/1998 | Higuchi et al. | 264/682 |

FOREIGN PATENT DOCUMENTS 55-75970 * 6/1980 (JP).

* cited by examiner

Primary Examiner—Karl Group
(74) Attorney, Agent, or Firm—Cooper & Dunham LLP

(57) ABSTRACT

Provided with a method for preparing a silicon nitride ceramic with high strength and toughness including: mixing 0.2–0.9 wt % of carbon (C) powder with silicon nitride powder containing 5.0–6.0 wt % of yttria ($Y_2O_3$) and 1.0–2.0 wt % of alumina ($Al_2O_3$) added thereto as a sintering agent, and preparing a molding; subjecting the molding to a carbothermal reduction treatment at 1400–1500° C.; and gas pressure sintering the molding at a temperature above 1850° C. after the carbothermal reduction treatment.

3 Claims, 1 Drawing Sheet

METHOD FOR PREPARING SILICON NITRIDE CERAMIC WITH HIGH STRENGTH AND TOUGHNESS

BACKGROUND OF THE INVENTION

1. Field of the Invention

Figure 1:
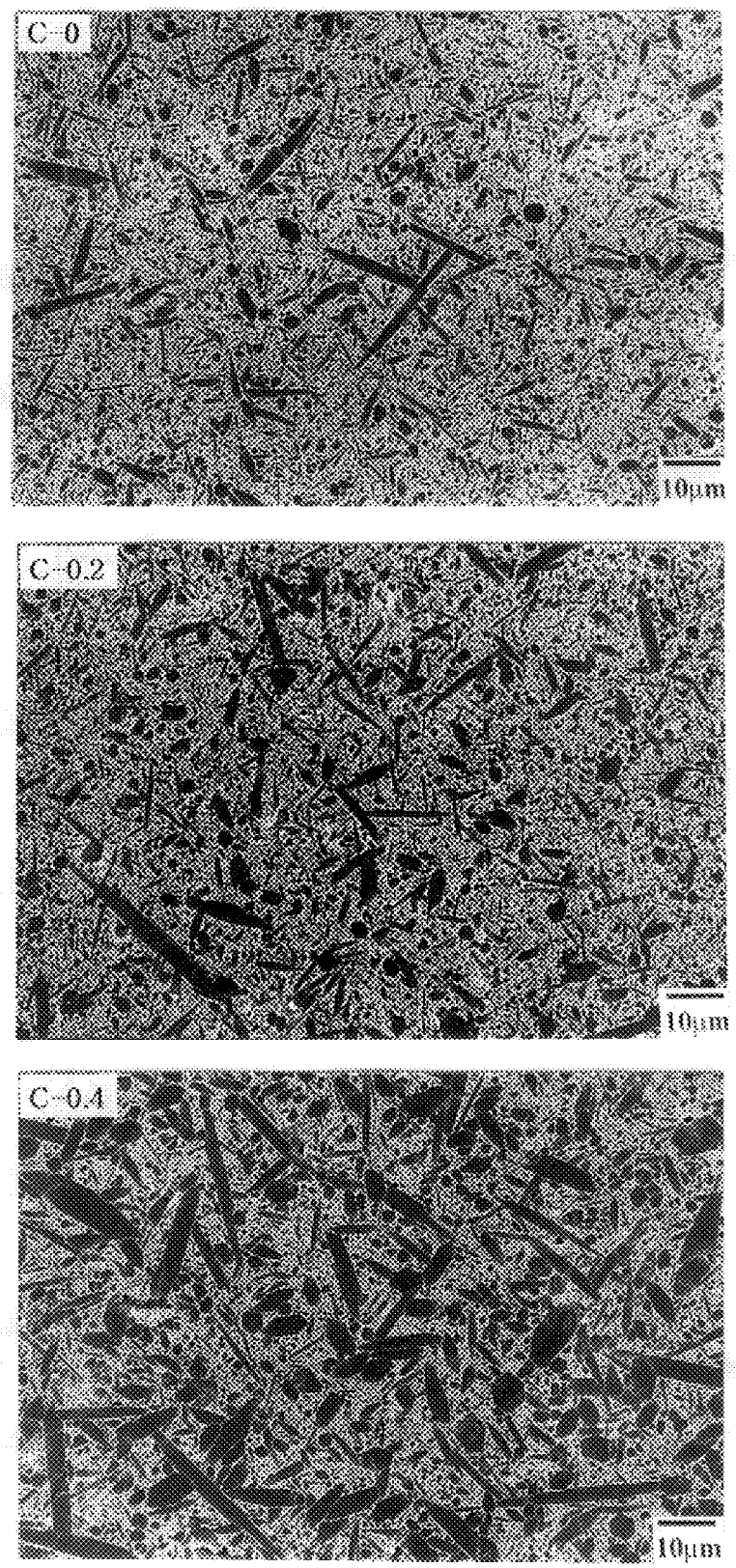

The present invention relates to a method for preparing a silicon nitride ceramic with high strength and toughness and, more particularly, to a method for preparing a silicon nitride ceramic with high strength and toughness which has a double microstructure preferable for enhancing mechanical properties, by adding carbon powder as a reducing agent to silicon nitride ($Si_3N_4$) powder containing a sintering agent such as yttria and alumina, milling the mixture of carbon powder and silicon nitride powder and controlling the oxygen content in a liquid phase obtained after a carbothermal reduction treatment of a molding at a specified temperature.

2. Discussion of Related Art

Silicon nitride ($Si_3N_4$) ceramic is generally utilized in the whole field of industry owing to its harmonized excellent properties such as high-temperature strength, chemical stability and abrasion resistance. Especially, silicon nitride ($Si_3N_4$) ceramic is known as a favorable material practical to heat engines such as a gas turbine thanks to its good properties at a high temperature.

But, the silicon nitride ceramic is inferior to the other metallic materials in regards to fracture toughness and reliability. After many studies made to enhance those properties of the silicon nitride ceramic, it is found that the silicon nitride ceramic can have its strength and toughness enhanced when it is controlled to have a double microstructure containing crystals distributed in rough gas particles.

Such a silicon nitride ceramic with the microstructure can have its strength and fracture toughness enhanced because of crack bridging formed by the rough hexagonal rod type crystals.

It is therefore important that the effective double microstructure has large-sized hexagonal rod type crystals distributed in a gas phase made up of fine particles. These fine particles whose usefulness depends on the particle size of the starting material powder can be obtained by reducing the particle size of the material powder by means of high-energy milling. The rough crystals are produced by addition of β silicon nitride (β-$Si_3N_4$) seeds.

However, high-energy milling of the material powder increases the specific surface area of the powder and hence causes an increase in the amount of silicon oxide $SiO_2$ on the surface of the silicon nitride particles. This affects densification of silicon nitride and phase transition so that lots of liquid phase and silicon oxynitride ($Si_3N_2O$) are formed, thereby influencing the properties of silicon nitride at a high temperature.

It is therefore necessary to reduce the excessive oxygen content in silicon nitride powder through an appropriate post treatment such as carbothermal reduction treatment after the high-energy milling in order to have an appropriate liquid phase with densification and good properties of the silicon nitride.

The carbothermal reduction treatment is a most widely used method for preparing highly pure silicon nitride powder from low-price materials. In the carbothermal reduction treatment, an appropriate amount of carbon is added to silica ($SiO_2$) powder and a heat treatment is performed under the atmosphere of nitrogen gas at an appropriate temperature. Then, silicon nitride powder is produced according to a chemical reaction expressed by:

$$3SiO_2(s)+6C(s)+2N_2(g) \rightarrow Si_3N_4(s)+6CO(g) \qquad (1)$$

In a case where the above method is used for fine silicon nitride powder containing a lot of sintered preparation, the oxygen content in the liquid phase can be reduced according to the temperature for the carbothermal reduction treatment and the composition and the amount of the liquid phase are dependent upon the amount of carbon added, and temperature and time for the heat treatment, etc.

There are many reports on how the addition of carbon affects the sintering of the silicon nitride. Wotting and his coworkers prepare silicon nitride powder containing a small amount of carbon through a carbon reduction treatment and sinter the silicon nitride preparation. In this experiment, the silicon nitride powder becomes harder to sinter with an increase in the carbon content, thereby resulting in a fine structure not preferable for enhancement of mechanical properties. It is reported that the result is because the carbon added reacts with silica ($SiO_2$) or oxygen on the surface of the silicon nitride powder to reduce the amount of liquid phase and change the composition. Watari and his coworkers report that carbon affects the phase transition of carbon-coated silicon nitride powder subjected to hot pressure (HP) sintering and hot iso-pressure sintering.

It is also reported that the remaining carbon forms silicon carbide (SiC) at a high temperature to affect the high-temperature sintering adversely.

An addition of the sintering agent is necessary for complete densification because the silicon nitride is formed by strong covalent bonds with a low self-diffusion coefficient. The liquid phase formed by the reaction between the sintering preparation added and silica ($SiO_2$) on the surface of the silicon nitride promotes the sintering property.

Examples of the sintering agent include metal oxides such as $Y_2O_3$, $Al_2O_3$ and MgO. Especially, for a $Si_3N_4$—$Y_2O_3$—$Al_2O_3$, the amount and the properties of the Y—Si—Al—O—N glass phase produced greatly affect the mechanical properties of silicon nitride ceramic such as high-temperature strength and crip resistance. There have been made many studies on this effects.

An Y—Si—Al—O—N glass phase which is produced when N is replaced with O in the Y—Al—Si—O glass phase has its properties variable according to the ratio of N to O. With an increase in the N content, oxynitride crystals can be deposited due to solid threshold in the glass phase. It is also reported that there are increased glass transition temperature, viscosity and elastic coefficient since the Si—N bond is shorter than the Si—O bond.

As understood from the phase property of the silicon nitride, two phases of silicon oxynitride ($Si_3N_2O$) appear in a case of high oxygen content and only silicon nitride ($Si_3N_4$) appears when using a general sintering agent (5.0–6.0% $Y_2O_3$+1.0–2.0% $Al_2O_3$). With a reduction of oxygen content, there can be obtained two phases of apatite ($Y_{10}Si_3O_{24}N_2$), woolastonite ($YSiO_2N$), wohlerite ($Y_4Si_2O_7N_4$) and melilite ($Y_2Si_3O_3N_4$).

When the apatite phase is formed during the sintering, the amount of liquid phase decreases to inhibit phase transition and sintering but rapidly increases during the sintering to produce a unique fine structure at a temperature exceeding the melting point of the apatite phase, 1750° C.

Although particle rearrangement occurs in general with a rapid increase in the density due to the liquid phase formed at around 1400° C., it is expected that the particle rearrangement is very difficult to take place in the above case due to formation of apatite and occurs rapidly at above the melting point of the apatite, 1700° C. In such a case, the boundary between the crystalline particles and non-crystalline particles is much prominent.

In the related art method for preparing a silicon nitride ceramic, the liquid phase formed by reaction between the sintering agent added and silica ($SiO_2$) on the surface of the silicon nitride powder causes sintering. It is therefore required to control the fine silicon nitride particles to have a double microstructure in which large-diameter rod-type reinforcing silicon nitride particles uniformly distributed in a gas phase, in order to enhance strength and toughness of the silicon nitride ceramic.

For this purpose, about 2–5% of silicon nitride seeds several micrometers in diameter are added to induce growth of reinforcing crystals.

However, such a related art method is disadvantageous in that the preparation of the silicon nitride seeds is too complicated and takes too much time.

SUMMARY OF THE INVENTION

It is therefore an object of the present invention to provide a method for preparing a silicon nitride ceramic with high strength and toughness by inhibiting a sintering procedure at low temperature through a method for controlling the oxygen content in the liquid phase such as a carbothermal reduction treatment without adding a crystallization seed and causing large-sized particles to grow rapidly at a higher temperature with small-sized particles remaining to control the double microstructure easily.

To achieve the first object of the present invention, there is provided a method for preparing a silicon nitride ceramic with high strength and toughness including: mixing 0.2–0.9 wt % of carbon (C) powder with silicon nitride powder containing 5.0–6.0 wt % of yttria ($Y_2O_3$) and 1.0–2.0 wt % of alumina ($Al_2O_3$) added thereto as a sintering agent, and preparing a molding; subjecting the molding to a carbothermal reduction treatment at 1400–1500° C.; and gas pressure sintering the molding at a temperature above 1850° C. after the carbothermal reduction treatment.

The molding after the carbothermal reduction treatment has a total oxygen content of 2.5–3.8 wt % and a remaining carbon content of less than 0.10–0.14 wt %, and has an oxynitride crystalline phase as a second phase.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

In the drawings:

FIG. 1 shows SEM (Scanning Electronic Microscope) photographs of a microstructure of samples containing 0 wt %, 0.2 wt % and 0.4 wt % of carbon according to the present invention.

DETAILED DESCRIPTION OF PREFERRED EMBODIMENT

Hereinafter, the present invention will be described in detail with reference to the accompanying drawings.

The present invention is characterized by a carbothermal reduction treatment applied to a silicon nitride ceramic preparing method, in which silicon nitride powder containing a sintering agent e.g., yttria and alumina is mixed with a predetermined amount of carbon powder and the mixture is subjected to the carbothermal reduction treatment to reduce the oxygen content in the liquid phase, thereby controlling the type of a second phase such as apatite formed during the subsequent gas pressure sintering procedure. As a result, there can be obtained a double microstructure preferable for enhancing the mechanical properties of the silicon nitride.

That is, the second phase melt at a predetermined temperature causes large particles to grow in small-sized gas particles through solution, deposition and particle growth and makes the silicon nitride densified rapidly at a high temperature in a different manner from normal silicon nitride. This makes it possible to obtain a double microstructure for high strength and toughness of silicon nitride.

Now, a detailed description will be made on the procedure of the present invention.

First, a sintering agent comprising 5.0–6.0% by weight of yttria ($Y_2O_3$) and 1.0–2.0% by weight of alumina ($Al_2O_3$) is mixed with 100% by weight of silicon nitride powder. 0.2–0.9% (less than 1.0%) by weight of carbon (C) powder is then added to the mixture. As stated previously, the sintering agent is necessary to densify the silicon nitride completely and the components and composition are common to those used in the general silicon nitride preparation.

The reason that the amount of carbon powder added is limited to 0.2–0.9% by weight lies in that less than 0.2% by weight of carbon powder hardly reduces the oxygen content and greater than 0.9% by weight of carbon powder removes too much oxygen content to make it difficult to perform sintering.

Subsequently, the powder mixture is processed into a molding through a pressure forming and hydrostatic molding apparatus.

The molding thus obtained is subjected to a carbothermal reduction treatment under the atmosphere of nitrogen gas at 1400–1500° C. for about 10 hours.

The reason that the temperature of the carbothermal reduction treatment is between 1400–1500° C. lines in that unchanged carbons are left after the carbothermal reduction treatment at below 1400° C. to hardly reduce the oxygen content in the liquid phase and all the carbons react with oxygens at a temperature above 1500° C., ending the carbothermal reduction rapidly.

Then, the molding is sintered under the nitrogen pressure at a temperature above 1850° C. for a predetermined period of time to have a double microstructure.

The reason that the molding is sintered with gas pressure at a temperature above 1850° C. is to densify the molding completely.

Hereinafter, the present invention will be described in more detail with reference to the following embodiment.

[Embodiment]

First, five samples are prepared according to the carbon content by adding 6 wt % and 1 wt % of yttria ($Y_2O_3$) and alumina ($Al_2O_3$) as a sintering agent to α silicon nitride (α-$Si_3N_4$) and further adding 0 wt %, 0.25 wt %, 0.50 wt %, 1.0 wt % and 2.0 wt % of carbon to the mixture, respectively.

The mixture of yttria ($Y_2O_3$), alumina ($Al_2O_3$) and carbon (C) with the silicon nitride ($Si_3N_4$) powder is planetary ball milled for 20 hours using a 5 mm-diameter silicon nitride ball and methanol as a solvent in a silicon nitride jar.

Thus obtained slurry is dried on a hot plate while agitating and filtered in 100 mesh. The powder mixture is processed into a molding in a 16 mm-diameter disc form with a pressure forming (30 MPa) and hydrostatic molding (250 MPa, 5 min) apparatus.

The molding thus prepared is then subjected to a carbon reduction treatment at 1450° C. under the nitrogen gas flowing at a rate of 0.2 liter/min for 10 hours. The reduced samples are sintered with gas pressure to obtain the final sintered preparation.

The gas pressure sintering is performed under the nitrogen pressure of 1 MPa at 1550° C., 1650° C., 1750° C. and 1850° C. for 30 min in order to examine phase transition of the silicon nitride ceramic and under the nitrogen pressure of 2 MPa at 1850° C. for 30 min, 3 hours and 6 hours in order to examine densification behavior of the silicon nitride ceramic.

For an analysis of the properties, the samples are analyzed in regards to their particle size distribution using a particle size analyzer (LS-130, Coulter Co., U.S.A.) in order to examine the pulverizing effect through the planetary ball milling after the powder mixing procedure.

Besides, the specific surface area is measured with a BET (ASAP-2010, Micromerities).

The samples before and after the carbothermal reduction treatment are weighted and analyzed for their oxygen and carbon contents with an oxygen analyzer (TC-136, LECO Co., Michigan, U.S.A.) and a carbon analyzer (CS-344, LECO Co., Michigan, U.S.A.).

The finally gas pressure sintered samples are measured for their relative density by a normal ceramic density measurement, a water immersion method.

Further, an X-ray diffractometer (Rigaku Co., Tokyo, Japan) is used for X-ray diffraction analysis and the ratio of α to β is calculated according to the Gazzara equation to examine phase transition of the samples.

The surface of the sintered material is polished to 1 micrometer with a diamond paste and plasma etched in order to examine the microstructure with a scanning electron microscope.

Table 1 shows the result of particle size analysis for the powder mixture after the planetary ball milling for 20 hours.

It is found that the powder mixture is milled very finely with an increase in the oxygen content after the 20-hour milling.

TABLE 1

Properties of Powder Mixture After 20-hour Milling.

| | |
|---|---|
| Oxygen Content (wt %) | 4.13 |
| BET (m$^2$/g) | 20.99 |
| D10 (μm) | 0.125 |
| D50 (μm) | 0.216 |
| D90 (μm) | 0.376 |

Table 2 shows the oxygen content and the carbon content of the samples before and after the carbothermal reduction treatment.

TABLE 2

Oxygen Content and Carbon Content Before and After Carbothermal Reduction Treatment.

| | Before Treatment | | After Treatment | |
|---|---|---|---|---|
| | Oxygen Content (wt %) | Carbon Content (wt %) | Oxygen Content (wt %) | Carbon Content (wt %) |
| $Si_3N_4$* | 1.2 | 0.18 | | |
| $Si_3N_4$ + 6Y1A* (Without Milling) | 3.0 | 0.18 | | |
| $Si_3N_4$ + 6Y1A* (4-Hour Milling) | 3.5 | | | |
| 0 wt % of Carbon Added | 4.0 | 0.32 | | |
| 0.2 wt % of Carbon Added | 4.3 | 0.53 | 3.8 | 0.11 |
| 0.5 wt % of Carbon Added | 4.2 | 0.76 | 3.6 | 0.10 |
| 1.0 wt % of Carbon Added | 4.3 | 1.2 | 2.7 | 0.12 |
| 2.0 wt % of Carbon Added | 4.4 | 1.5 | 2.5 | 0.14 |

Note)
*Values from References

The oxygen content is 1.2 wt % in silicon nitride and 1.75 wt % in the sintering preparation (6 wt % $Y_2O_3$+1 wt % $Al_2O_3$).

For the silicon nitride mixture with 6 wt % of $Y_2O_3$ and 1 wt % of $Al_2O_3$ added without milling, the total oxygen content is about 3.0 wt % and the oxygen content after the 4-hour planetary ball milling is 3.5 wt %.

For most silicon nitride samples with 6 wt % of $Y_2O$ and 1 wt % of $Al_2O_3$ added, the oxygen content is expected to be in the range of 3.0–3.5 wt %.

The oxygen content is 4.0 wt % for the sample with no carbon content after 20-hour milling. For samples with the carbon content of 0.2 to 2.0 wt %, the oxygen content is 4.2–4.4 wt % before the carbothermal reduction treatment and 2.5–3.8 wt % after the carbothermal reduction treatment.

It is found that more oxygens are eliminated after the carbothermal reduction treatment for the samples with higher carbon content. During the carbothermal reduction treatment, all the samples are removed of the most carbons and leave only 0.10–14 wt % of carbon. This amount of the remaining carbon is very small ignorable relative to the carbon content (0.18–0.20 wt %) in the original silicon nitride powder. Thus, there is no need of a procedure for removing the remaining carbons after the carbothermal reduction treatment.

It can be seen that the oxygen content and the carbon content are reduced for all samples after the carbothermal reduction treatment with an increase in the amount of carbon added and the decrement of the oxygen content is variable according to the amount of carbon added. Particularly, the oxygen content in the samples containing 0 wt %, 0.2 wt % and 0.5 wt % of carbon exceeds 3.0–3.5 wt %, the range of the oxygen content in the silicon nitride powder with 6 wt % of $Y_2O_3$ and 1 wt % of $Al_2O_3$ added as a sintering agent. The oxygen content in the samples containing 1.0 wt % and 2.0 wt % of carbon is lower than the normal oxygen content, 3.0–3.5 wt %. It is thus expected that the amount of liquid phase is considerably small when the samples are densified through the gas pressure sintering procedure.

As shown in Table 2, the oxygen content is hardly reduced when the carbon content is less than 0.2 wt % (e.g., for the sample with 0 wt % of carbon) but much reduced when the carbon content exceeds 1.0 wt % (e.g., for the sample with 2.0 wt % of carbon) so that the subsequent sintering procedure is difficult to realize.

The X-ray diffraction analysis according to the sintering temperature reveals that the sample containing 1.0 wt % of carbon has a large amount of α silicon nitride (α-$Si_3N_4$)

phase detected after the carbothermal reduction treatment and in a small amount of β silicon nitride (β-$Si_3N_4$) phase and a second phase, apatite ($Y_{10}Si_6O_{24}N_2$).

As the temperature raises for this sample and α phases change to β phases, at a temperature above 1750° C., only β phases are detected and the apatite phase is not detected any more. The apatite phase is detectable at a temperature less than 1650° C.

On the contrary, there are detected, from the sample containing 1.0 wt % of carbon, a large amount of α silicon nitride (α-$Si_3N_4$), a small amount of β silicon nitride (β-$Si_3N_4$) and a second phase, woolastonite ($Y_4Si_2O_7N_4$), and an unidentified phase. The woolastonite phase is not detected from the temperature of 1750° C. but the second phase estimated as YAM ($Y_4Si_2O_7N_4$) is detected again at the temperature exceeding 1750° C.

The silicon nitride powder generally contains a small amount of oxygen in itself and the oxygen content affects the whole composition of the silicon nitride ceramic. Especially, the silicon nitride ceramic with yttria ($Y_2O_3$) and alumina ($Al_2O_3$) added as a sintering agent has the composition of the respective component dependent upon the oxygen content in the silicon nitride itself and the amount of the sintering agent added. Thus, the whole composition of the silicon nitride including the composition of the glass phase is determined.

The amount of sintering agent added and the oxygen content in the silicon nitride powder determine the amount and the composition of the Y—Si—Al—O—N glass phase which is a crystalline glass phase in the $Si_3N_4$—$Y_2O_3$—$Al_2O_3$ system, and hence the properties of the silicon nitride ceramic.

Especially, when the oxygen content in the powder mixture determined by the composition of the silicon nitride powder and the sintering agent added is reduced by a method such as a carbothermal reduction treatment prior to the final sintering procedure, the whole composition of the silicon nitride and the amount and the composition of the crystalline glass phase are varied. If the oxygen content decreases to below a threshold, several types of crystalline phases are deposited as a second phase.

A state diagram of the Y—Si—Al—O—N system shows oxynitride crystalline phases depositable according to the composition of the $Si_3N_4$—$Y_2O_3$—$Al_2O_3$ system. As the oxygen content decreases, there can be deposited apatite, YAM, wollastonite and melilite phases which have different melting points from one another. It is thus expected that the crystalline phase deposited affects the densification behavior and the microstructure of the silicon nitride ceramic.

Table 3 shows the relative densities of the respective samples with an increase in the gas pressure sintering temperature and the sintering time.

TABLE 3

Relative Density (Unit: %) of Samples According to Sintering Conditions.

|  | C-0 | C-0.2 | C-0.5 | C-1.0 | C-2.0 |
|---|---|---|---|---|---|
| After Carbothermal Reduction Treatment | — | 59.00 | 55.00 | 52.00 | 50.00 |
| 1550° C., 0.5 hr | 68.51 | 65.99 | 61.17 | 53.80 | 51.25 |
| 1650° C., 0.5 hr | 84.53 | 72.68 | 64.46 | 61.81 | 58.76 |
| 1750° C., 0.5 hr | 89.77 | 76.98 | 65.55 | 64.36 | 59.29 |
| 1850° C., 0.5 hr | 97.56 | 96.84 | 81.32 | 69.82 | 62.90 |
| 1850° C., 3 hr | 99.16 | 100 | 99.36 | 75.80 | 68.84 |
| 1850° C., 6 hr | 98.76 | 100 | 100 | 80.19 | 66.56 |

Note)
C-0: A Sample containing no carbon
C-0.2: A sample containing 0.2 wt % of carbon
C-0.5: A sample containing 0.5 wt % of carbon
C-1.0: A sample containing 1.0 wt % of carbon
C-2.0: A sample containing 2.0 wt % of carbon In Table 3, the samples show three densification behaviors. The sample containing no carbon without the carbothermal reduction treatment has the same densification behavior as the normal silicon nitride ceramic. When considering that the relative density of the initial molding is about 50%, the densification occurs rapidly until the temperature of 1650° C. due to rearrangement of the particles during the sintering procedure. At the temperature above 1650° C., the densification becomes slow through dissolution, deposition and crystal growth procedures.

On the contrary, the samples containing 0.2 wt % and 0.5 wt % of carbon have different densification behaviors.

That is, the densification hardly occurs with a low relative density of 60–70% irrespective of the sintering temperature until 1750° C. and proceeds rapidly at 1850° C. The two samples are completely densified at 1850° C. after 3 hours.

The identification hardly occurs due to the apatite phase that is an oxynitride crystalline phase deposited after the carbothermal reduction treatment at 1450° C. but proceeds rapidly due to regeneration of the liquid phase in a sufficient amount at 1750° C. at which the apatite phase is melt.

The samples containing 1.0 wt % and 2.0 wt % of carbon show the same densification behavior as the samples containing 1.0 wt % and 0.5 wt % of carbon until the sintering temperature, 1750° C. For these samples, the density is not increased any more with an increase in the sintering temperature and the sintering time. The samples have a low relative density below 80% even after a 6-hour sintering procedure at 1850° C.

The reason of this lies in that the samples containing 1.0 wt % and 2.0 wt % of carbon have a low oxygen content after the carbothermal reduction treatment to form an oxynitride phase containing a relatively small amount of oxygen. The liquid phase and remaining phases formed in a small amount are hard to be diffused uniformly around the particles due to their high viscosity and the oxynitride crystals thus formed remain after the sintering procedure due to their melting point higher than the sintering temperature.

FIG. 1 shows photographs of the microstructures taken with an SEM (Scanning Electronic Microscope) for the sample containing no carbon and the samples containing 0.2 wt % and 0.5 wt % of carbon at the sintering temperature of 1850° C. for 6 hours. As shown in FIG. 1, the number and the diameter of major phase crystals increase with an increase in the carbon content although the size of particles in the gas phase is kept small.

The reason of this lies in that the apatite crystalline phase appearing after the carbothemal reduction treatment inhibits the initial densification mechanism, the rearrangement of particles until its melting point. The rearrangement of particles and the dissolution and deposition procedures are accelerated at a high temperature of 1700–1800° C. so that the particles in the major phase crystals can be grown to a large size.

As understood from the photograph, unlike the densification behavior of normal silicon nitrides, the present invention causes the densification inhibited and then accelerated rapidly at a high temperature and thereby produces a double microstructure for enhancing the strength and toughness of silicon nitride. Therefore, the present invention can prepare a silicon nitride ceramic having good properties by controlling the oxygen content though the carbothermal reduction treatment as well as the composition and the amount of the liquid phase with formation of a second phase.

According to the present invention as described above, the densification of the sintered material is inhibited until a certain high temperature and accelerated rapidly at a high temperature as the sintering temperature rises. The present invention also controls the oxygen content through the carbothermal reduction treatment and hence the composition and the amount of the liquid phase as well as forming a second phase. This makes it possible to obtain a double microstructure for enhancing the strength and the toughness of the silicon nitride.

In will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A method for preparing a silicon nitride ceramic with high strength and toughness comprising:

mixing 0.2–0.9 wt % of carbon (C) powder with silicon nitride powder containing 5.0–6.0 wt % of yttria ($Y_2O_3$) and 1.0–2.0 wt % of alumina ($Al_2O_3$) added thereto as a sintering agent, and preparing a molding;

subjecting the molding to a carbothermal reduction treatment at 1400–1500° C.; and gas pressure sintering the molding at a temperature above 1850° C. after the carbothermal reduction treatment.

2. The method as claimed in claim 1, wherein the molding after the carbothermal reduction treatment has a total oxygen content of 2.5–3.8 wt % and a remaining carbon content of less than 0.14 wt %.

3. The method as claimed in claim 1, wherein the molding after the carbothermal reduction treatment has an oxynitride crystalline phase as a second phase.

* * * * *